United States Patent
Fang et al.

(10) Patent No.: US 8,432,441 B2
(45) Date of Patent: Apr. 30, 2013

(54) METHOD AND SYSTEM FOR MEASURING CRITICAL DIMENSION AND MONITORING FABRICATION UNIFORMITY

(75) Inventors: Wei Fang, Milpitas, CA (US); Hong Xiao, Pleasanton, CA (US); Jack Jau, Los Altos Hills, CA (US)

(73) Assignee: Hermes Microvision Inc., Hsinchu (TW)

( * ) Notice: Subject to any disclaimer, the term of this patent is extended or adjusted under 35 U.S.C. 154(b) by 10 days.

(21) Appl. No.: 13/032,105

(22) Filed: Feb. 22, 2011

(65) Prior Publication Data
US 2012/0212601 A1    Aug. 23, 2012

(51) Int. Cl.
*H04N 7/18* (2006.01)
(52) U.S. Cl.
USPC ............................................. 348/86; 348/80
(58) Field of Classification Search .......... 348/80, 348/86; 703/14; 382/141; 438/14
See application file for complete search history.

(56) References Cited

U.S. PATENT DOCUMENTS

| | | | |
|---|---|---|---|
| 2003/0215964 A1* | 11/2003 | Gau et al. | 438/14 |
| 2007/0288219 A1* | 12/2007 | Zafar et al. | 703/14 |
| 2009/0080759 A1* | 3/2009 | Bhaskar et al. | 382/141 |

* cited by examiner

*Primary Examiner* — Allen Wong
(74) *Attorney, Agent, or Firm* — Rosenberg, Klein & Lee

(57) ABSTRACT

A method for measuring critical dimension (CD) includes steps of: scanning at least one area of interest of a die to obtain at least one scanned image; aligning the scanned image to at least one designed layout pattern to identify a plurality of borders within the scanned image; and averaging distances each measured from the border or the plurality of borders of a pattern associated with a specific type of CD corresponding to the designed layout pattern to obtain a value of CD of the die. The value of critical dimensions of dies can be obtained from the scanned image with lower resolution which is obtained by relatively higher scanning speed, so the above-mentioned method can obtain value of CD for every die within entire wafer to monitor the uniformity of the semiconductor manufacturing process within an acceptable inspection time.

4 Claims, 8 Drawing Sheets

METHOD AND SYSTEM FOR MEASURING CRITICAL DIMENSION AND MONITORING FABRICATION UNIFORMITY

BACKGROUND OF THE INVENTION

1. Field of the Invention

The present invention relates to a method and a system for measuring critical dimension and monitoring fabrication uniformity, and more particularly to a method and a system for measuring critical dimension and monitoring fabrication uniformity from a scanned image with lower resolution.

2. Description of the Prior Art

Uniformity of semiconductor fabrication, which relates to manufacturing yield, can be obtained from critical dimension (CD) distribution in an entire wafer. Therefore, critical dimension is a significant feature in semiconductor manufacturing process. In recent years, line width, being a type of critical dimension and continuously shrunk with semiconductor process progress, is increasingly harder to be measured consequently.

Traditionally, CD-scanning electron microscope (CD-SEM) is used for measuring line width of a die. In order to provide scanned images with ultra high resolution, the probe spot of CD-SEM must be extremely small. Therefore, the electron current, also known as primary beam, provided by the CD-SEM is bound to be very small to reduce coulomb repel force between the electrons. However, in order to image, enough signal electrons, also known as secondary electron, must be collected by the detector of CD-SEM, so the scan speed must be extremely slow. In current CD metrology, only five dies on a 12" wafer at 65 nm node are selected to be measured for critical dimension to represent fabrication uniformity of the entire wafer, because the inspection speed of the CD-SEM limits the number of dies can be inspected under the requirement of semiconductor manufacturing speed. However, while node proceeds to less than 32 nm on an 18" wafer, not only critical dimensions of five dies can not represent the entire 18" wafer any more, but the five dies will incur more inspection time.

Accordingly, how to more quickly measure critical dimension and monitor fabrication uniformity is now highly desirable.

SUMMARY OF THE INVENTION

Specific distances between borders of a repeated pattern of interest or repeated patterns of interest in a die of a scanned image is statistically averaged to obtain an CD of interest by using an E-beam inspection tool. CD distribution in different dies of a wafer can be obtained then to monitor fabrication uniformity of the wafer.

The present invention is thus directed to a method and a system for measuring critical dimension and monitoring fabrication uniformity, which identifies borders of layout patterns from a scanned image with lower resolution and then statistically processes distances measured from the borders to obtain critical dimensions. Therefore, the present invention can scan a die with relatively quicker scan speed to obtain a scanned image with lower resolution and measure critical dimensions of the die and/or monitor fabrication uniformity of the wafer.

In the first embodiment, the proposed method for measuring critical dimension includes steps of: scanning at least one area of interest of a die to obtain at least one scanned image; aligning the scanned image to at least one designed layout pattern to identify a plurality of borders within the scanned image; and averaging distances each measured from the border or the plurality of borders of a pattern associated with a specific type of critical dimension corresponding to the designed layout pattern to obtain a value of critical dimension of the die.

In the second embodiment, the proposed method for monitoring fabrication uniformity includes steps of: scanning at least one area of interest of a wafer to obtain at least one scanned image; aligning the scanned image to at least one designed layout pattern to identify a plurality of borders within the scanned image; and averaging distances each measured from the border or the plurality of borders of a pattern associated with a specific type of critical dimension corresponding to the designed layout pattern to obtain the value of critical dimension for every die of the entire wafer.

In the third embodiment, the proposed method for monitoring fabrication uniformity includes steps of: defining a plurality of layout patterns within a die of a wafer by a designed layout pattern which comprises a Graphic Data System (GDS) or an Open Artwork System Interchange Standard (OASIS), or is drawn directly; selecting which specific type of critical dimension of the layout patterns is to be measured, and the corresponding operator; scanning at least one area of interest of the wafer to obtain at least one scanned image by using an E-beam inspection tool; aligning the scanned image to the layout patterns to identify a plurality of borders within the scanned image; calculating distances each measured from the border or the plurality of borders of a pattern associated with the specific type of critical dimension from the scanned image; and averaging the distances to obtain the value of critical dimension for every die of the entire wafer.

In the fourth embodiment, the proposed computer readable medium is encoded with a computer program implementing a method for monitoring fabrication uniformity, wherein the method includes steps of: scanning at least one area of interest of a wafer to obtain at least one scanned image; aligning the scanned image to at least one designed layout pattern to identify a plurality of borders within the scanned image; and averaging distances each measured from the border or the plurality of borders of a pattern associated with a specific type of critical dimension corresponding to the designed layout pattern to obtain the value of critical dimension for every die of the entire wafer.

In the fifth embodiment, the proposed system for monitoring fabrication uniformity includes a charged particle beam probe generator, a charged particle beam deflection module, an image forming apparatus and a monitoring module. The charged particle beam probe generator is configured for generating a charged particle beam probe. The charged particle beam deflection module is configured for scanning the charged particle beam probe across a surface of at least one area of interest of a wafer. The image forming apparatus is configured for detecting secondary charged particles emitted from the surface of the area of interest being bombarded by the charged particle beam probe and forming at least one scanned image accordingly. The monitoring module is coupled with the image forming apparatus and encoded with a computer program implementing a method for monitoring fabrication uniformity, wherein the method comprises steps of: aligning the scanned image to at least one designed layout pattern to identify a plurality of borders within the scanned image; and averaging distances each measured from the border or the plurality of borders of a pattern associated with a specific type of critical dimension corresponding to the designed layout pattern to obtain the value of critical dimension for every die of the entire wafer.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Although the E-beam inspection tool also uses as a probe to inspect wafer, electron current, however, is very large compared to CD-SEM, such that probe spot is large enough that inspect speed can be very fast. However, resolution is not qualified compared to CD-SEM because of large probe spot. Therefore, E-beam inspection tool now can not be used as CD metrology tool. In this invention, the E-beam inspection tool can be used to measure CD.

Although semiconductor fabrication process in a wafer may have distribution or variation topography. However, topography would be uniform in one die in nowadays semiconductor manufacturing process. With constant environment monitored by the E-beam inspection process, inspection with high resolution can be obtained by using statistical strategy and algorithm. A statistical average is used to wear out blur image to obtain sharp border of a specific pattern. Border or a specific pattern can be defined by users, or a border operator can define border of a pattern. Thus, CD can be obtained by using E-beam inspection tool.

CD distribution in all dies, which is CD uniformity or CDU, can be obtained to monitor fabrication uniformity of a wafer. The scanned image is not particular for CD measure, but also for conventional review inspection or VC (voltage contrast) inspection.

Because the E-beam inspection tool can inspect the entire wafer in a couple of hours at 65 nm node in a 12" wafer, CD of every die of the entire wafer can be obtained to output CD uniformity to check semiconductor fabrication uniformity. To the conventional CD-SEM metrology, under the same inspection time, only five CDs from five dies of the entire wafer are obtained. Thus, these five CDs represent features of the entire wafer in semiconductor manufacturing process, that more or less, this representation is restricted.

The term, CD (Critical Dimension), in this invention is not construed as line width only, but also a distance between borders of a pattern or patterns. The term, border, means a portion of rim or edge of a layout pattern, and a plurality of borders may constitute a layout pattern.

Figure 1:
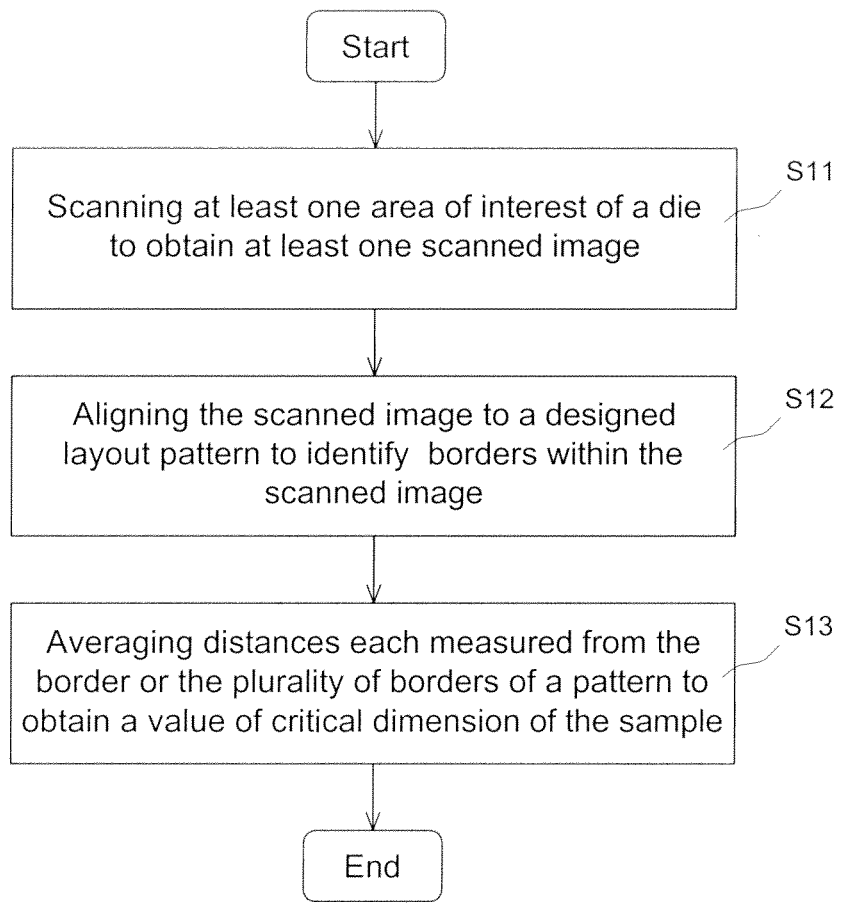
FIG. 1 is a flowchart schematically illustrating a method for measuring critical dimension according to an embodiment of the present invention.

Referring to FIG. 1, a method for measuring critical dimension according to an embodiment of the present invention includes the following steps. Firstly, at least one area of interest of a die is scanned to obtain at least one scanned image (S11). In one embodiment, the scanned image can be obtained by using an E-beam inspection tool to scan a surface of the die. Compared with the CD-SEM, the E-beam inspection tool has the features of larger electron current and probe spot of electron beam, so it incurs less time to scan and image. Then, the scanned image obtained from the step S11 is aligned to at least one designed layout pattern to identify a plurality of borders within the scanned image (S12). Finally, distances each measured from the border or the plurality of borders of a pattern associated with a specific type of critical dimension corresponding to the designed layout pattern are averaged to obtain a value of critical dimension of the die (S13).

Figure 2:
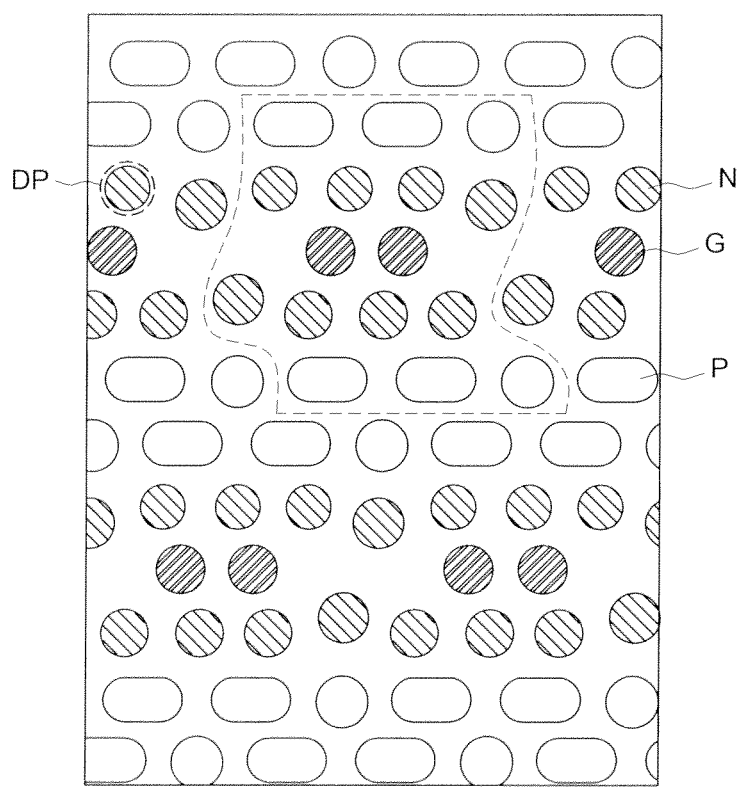
FIG. 2 is a diagram schematically illustrating a layout pattern drawn on a scanned image.

In one embodiment, the designed layout pattern may be a Graphic Data System (GDS) or an Open Artwork System Interchange Standard (OASIS). Alternatively, the designed layout pattern can be drawn on the scanned image directly. For example, FIG. 2 illustrates a part of an image of a memory module, wherein the label G represents a gate electrode of metal oxide semiconductor (MOS); the label N represents an n-type electrode of MOS; and the label P represents a p-type electrode of MOS. Because the memory module includes a few patterns that are the same and/or periods of repeating patterns, a period of which is shown as the region enclosed by the dotted line, the layout patterns DP with the same feature can be predicted and drawn on the scanned image to identify corresponding layout patterns within the scanned image.

Figure 3A:
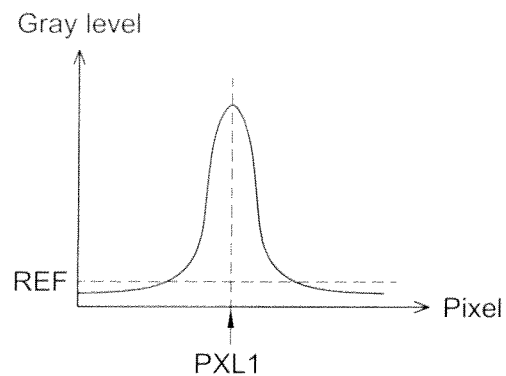
FIG. 3a to FIG. 3c are curve diagrams schematically illustrating variation of gray level of pixels across a border.
Figure 3B:
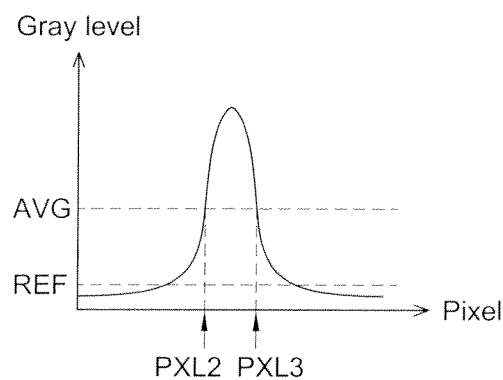
Figure 3C:
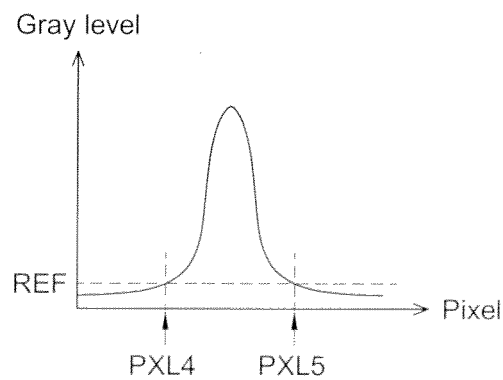

Refer to FIG. 3a, FIG. 3b and FIG. 3c that illustrate a method for defining borders within the scanned image. FIG. 3a to FIG. 3c illustrates variation of gray level of pixels across a border. By corresponding the scanned image to the designed layout pattern, peripheral regions close to the designed layout pattern can be identified in the scanned image, wherein the peripheral regions include a plurality of pixels of which gray level is greater than a reference value REF. As illustrated in FIG. 3a, within the peripheral region, the specific pixel PXL1 of which gray level is a peak can be defined as a border-pixel, and the border of layout pattern is composed of the plurality of border-pixels.

In one embodiment, referring to FIG. 3b, one of the specific pixels PXL2, PXL3 of which gray level is equal to an averaged value AVG of gray levels can also be defined as the border-pixel, wherein the averaged value AVG is obtained by averaging gray levels of the pixels of which gray levels are greater than the reference value REF within the peripheral region. It should be noted that the corresponding specific pixel PXL2 or specific pixel PXL3 should be selected to be defined as the border-pixel in the same processing procedure.

Referring to FIG. 3c, within the peripheral region, one of specific pixels PXL4, PXL5 of which gray level is equal to the reference value REF can also be defined as the border-pixel. Similarly, the corresponding specific pixel PXL4 or specific pixel PXL5 should be selected to be defined as the border-pixel in the same processing procedure. It should be noted that the border-pixel can be shifted a predetermined value from the specific pixel PXL1~PXL5. For example, the third pixel at right side of the specific pixel PXL5 can be defined as the border-pixel.

Figure 4:
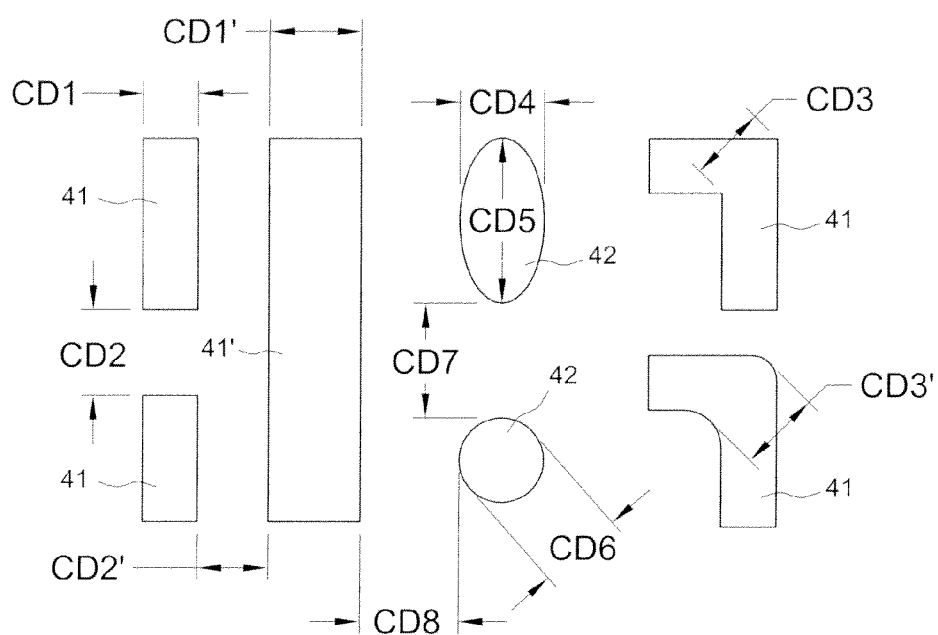
FIG. 4 is a diagram schematically illustrating various types of critical dimension.

Referring to FIG. 4, a single die or the area of interest could include various types of critical dimension to be measured. For example, the type of critical dimension may be line width CD1 and CD1', line spacing CD2, CD2', corner width CD3, CD3' of trace 41 and 41', short axis width CD4 of conductive contact 42, long axis width CD5 of conductive contact 42, diameter CD6 of conductive contact 42, spacing CD7 between conductive contacts 42, or spacing CD8 between trace 41 and conductive contact 42. And each type of critical dimension can be processed by a corresponding operator.

Figure 5:
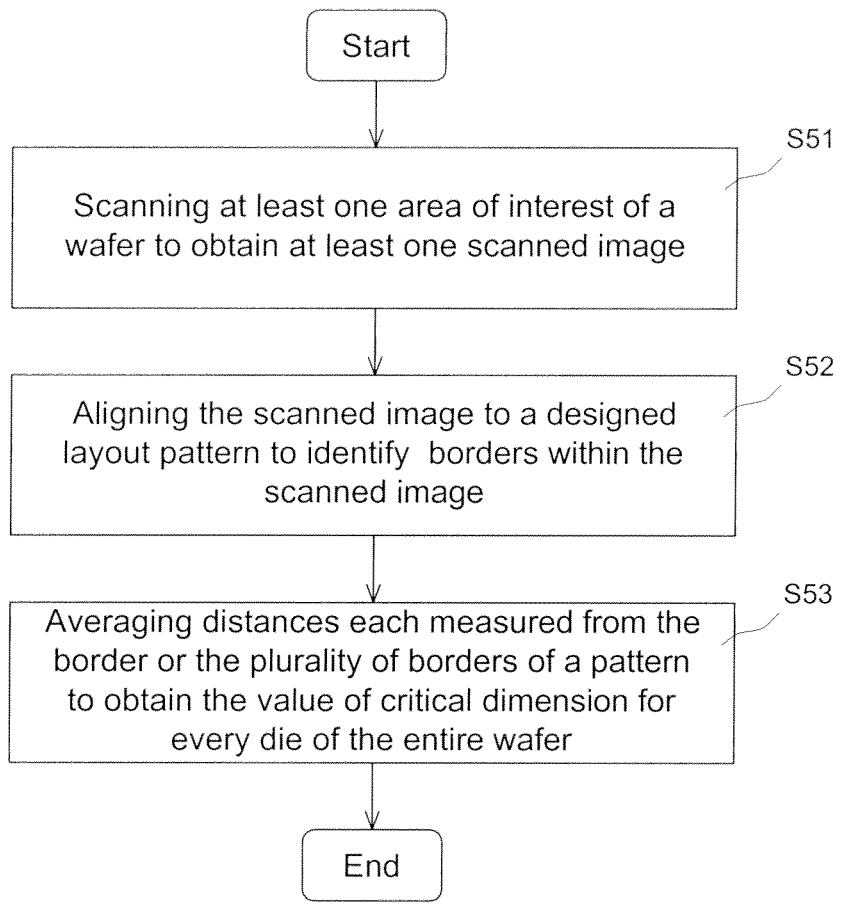
FIG. 5 is flowchart schematically illustrating a method for monitoring fabrication uniformity according to an embodiment of the present invention.

Referring to FIG. 5, a method for monitoring fabrication uniformity according to an embodiment of the present invention includes the following steps. Firstly, at least one area of interest of a wafer is scanned to obtain at least one scanned image (S51). For example, the scanned image can be obtained by using an E-beam inspection tool to scan a surface of the wafer. Features of the E-beam inspection tool have been described previously and will not be repeated here. Then, the scanned image obtained from the step S51 is aligned to at least one designed layout pattern to identify a plurality of borders within the scanned image (S52). Finally, distances each measured from the border or the plurality of borders of a pattern associated with a specific type of critical dimension corresponding to the designed layout pattern are averaged to obtain the value of critical dimension for every die of the entire wafer (S53). From the above we can see that the present invention obtains the value of critical dimension for every die of the entire wafer to represent uniformity of the semiconductor manufacturing process of the entire wafer, instead of the values of critical dimension of a few dies. Therefore, more accurate uniformity of the semiconductor manufacturing process illustrated in FIG. 6 can be obtained by the present invention, wherein the label 60 represents a wafer; the label 61 represents a die; and the label 62 represents legend for various sizes of critical dimension.

Figure 6:
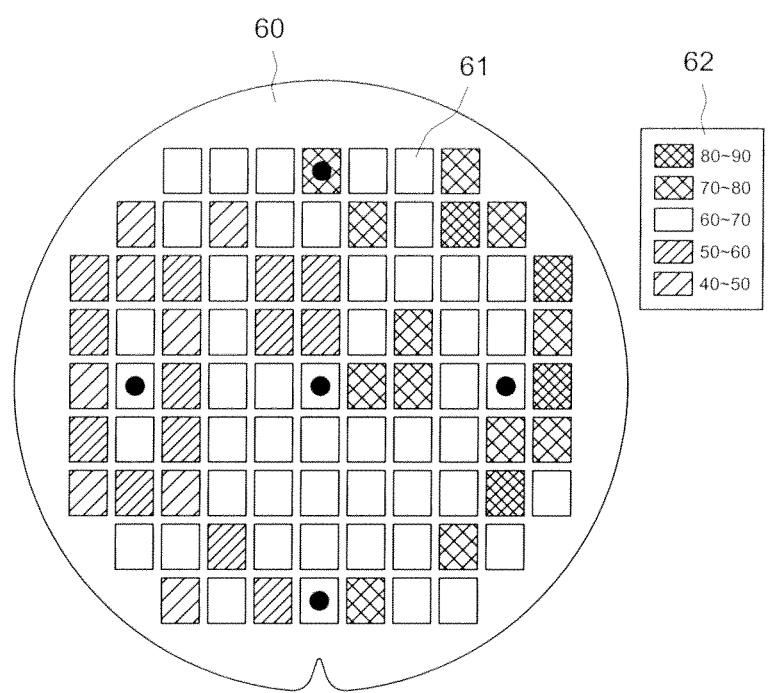
FIG. 6 is a diagram schematically illustrating fabrication uniformity of a wafer.

For example, in the conventional critical dimension inspection, only five values of critical dimension from five dies, illustrated in FIG. 6 with solid circle, of the entire wafer are obtained. According to the result of critical dimension inspection illustrated in FIG. 6, the uniformity of the semiconductor manufacturing process of the entire wafer seems to be acceptable, because only one value of critical dimension of the die diverges from the predetermined value. However, based on the method of the present invention users can obtain critical dimension distribution in the entire wafer 60 and accordingly adjust the manufacturing parameters. For example, from the critical dimension distribution illustrated in FIG. 6 we can see that the value of critical dimension at left side of the wafer 60 is smaller and the value of critical dimension at the right side is larger than the predetermined value, and users can perform trouble shooting based on the distribution trend to improve the manufacturing process. Therefore, only five values of critical dimension represent features of the entire wafer in conventional semiconductor manufacturing process, that more or less, this representation is restricted.

Figure 7:
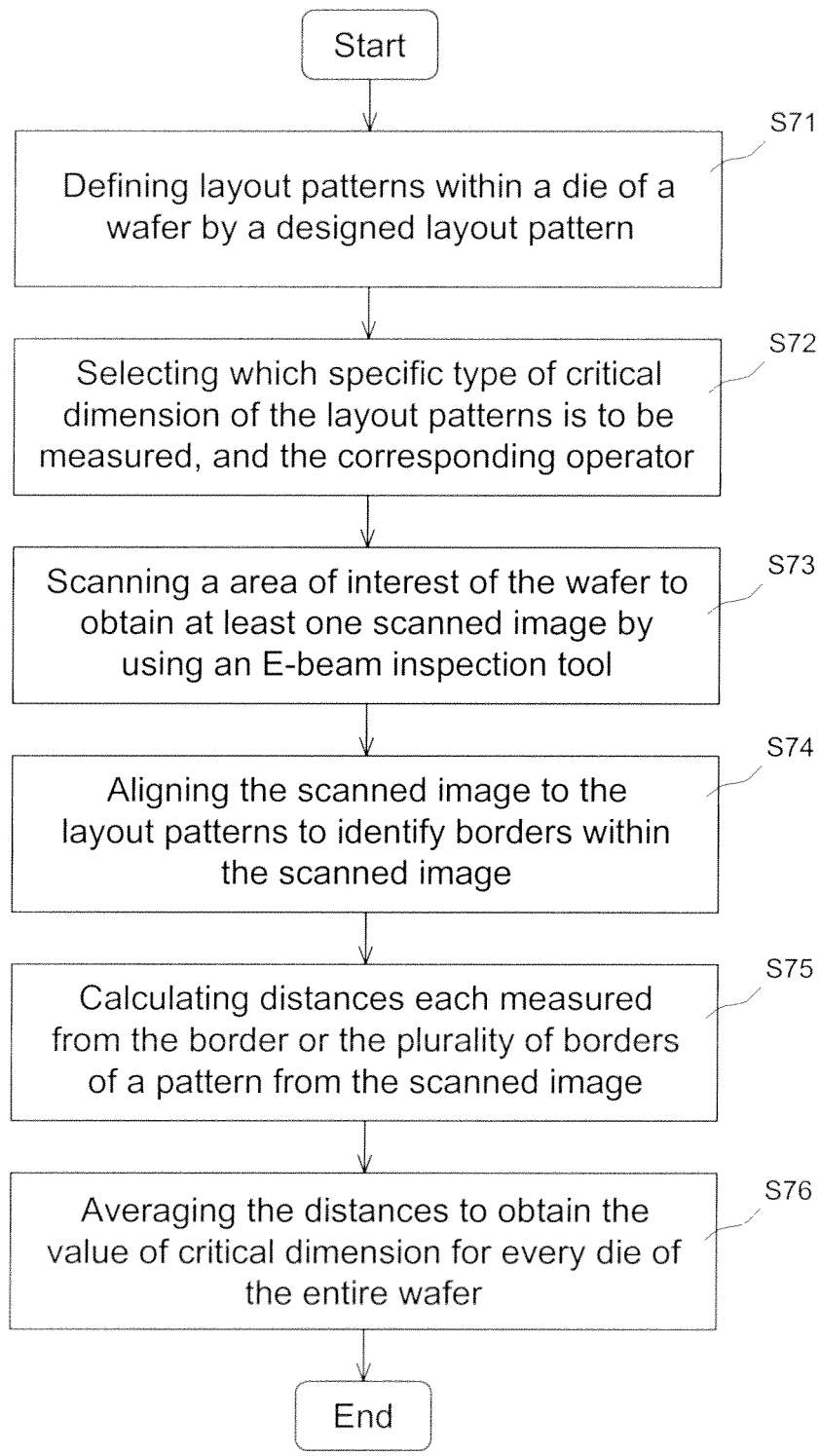
FIG. 7 is flowchart schematically illustrating a method for monitoring fabrication uniformity according to another embodiment of the present invention.

Referring to FIG. 7, a method for monitoring fabrication uniformity according to another embodiment of the present invention includes the following steps. Firstly, a plurality of layout patterns within a die of a wafer are defined by a designed layout pattern which comprises a GDS or an OASIS, or is drawn directly (S71). Then, a user selects which specific type of critical dimension in the layout patterns, such as line, width, line spacing and size of conductive contact etc., is to be measured and the corresponding operator (S72). At least one area of interest of the wafer is scanned to obtain at least one scanned image by using an E-beam inspection tool (S73), and the scanned image is aligned to the layout patterns to identify a plurality of borders within the scanned image (S74). Finally, distances each measured from the border or the plurality of borders of a pattern associated with a specific type of critical dimension in the scanned image are calculated (S75), and then the distances is are averaged to obtain the value of critical dimension for every die of the entire wafer (S76).

A computer readable medium according to an embodiment of the present invention is encoded with a computer program which implements a method for monitoring fabrication uniformity illustrated in FIG. 5. Detail implementing steps of the method of the present invention has been described previously and will not be repeated here.

Figure 8:
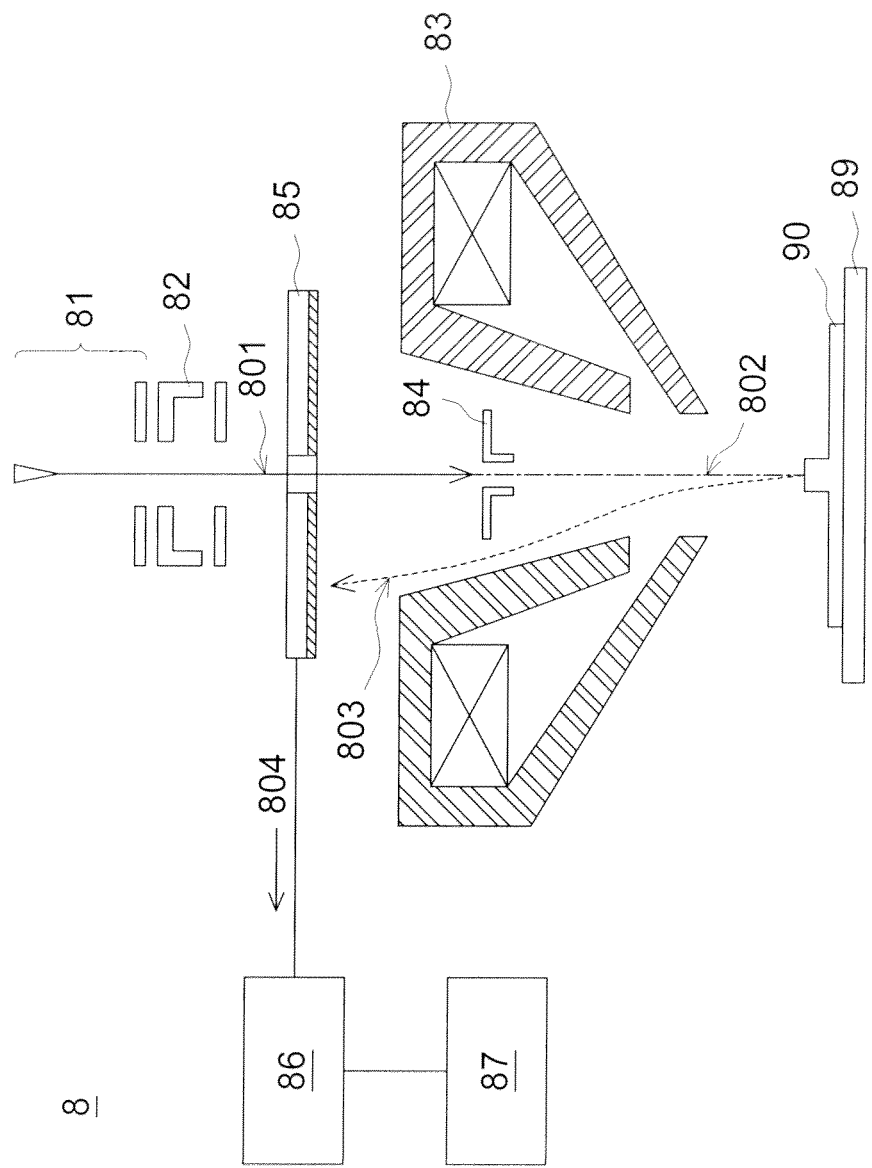
FIG. 8 is a diagram schematically illustrating a system for monitoring fabrication uniformity according to an embodiment of the present invention.

Please refer to FIG. 8 which illustrates a system 8 for monitoring fabrication uniformity according to an embodiment of the present invention. The system 8 is used for inspecting a sample 90 (such as a wafer) on a sample stage 88 and comprises a charged particle beam generator 81, a condenser lens module 82, a probe forming objective lens module 83, a charged particle beam deflection module 84, a secondary charged particle detector module 85, an image forming module 86 and a monitoring module 87.

The charged particle beam generator 81 is used for generating a primary charged particle beam 801. The condenser lens module 82 is used for condensing the generated primary charged particle beam 801. The probe forming objective lens module 83 is used for focusing the condensed primary charged particle beam into a charged particle beam probe 802. The charged particle beam deflection module 84 is used for scanning the formed charged particle beam probe 802 across surfaces of areas of interest on the sample 90 secured on the sample stage 88. In one embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 802.

The secondary charged particle detector module 85 is used for detecting secondary charged particles 803 emitted from the sample surface (may also be along with other reflected or scattered charged particles from the sample surface) upon being bombarded by the charged particle beam probe 802 to generate a secondary charged particle detection signal 804. The image forming module 86 coupled with the secondary charged particle detector module 85 for receiving the secondary charged particle detection signal 4 from the secondary charged particle detector module 85 and forming at least one scanned image accordingly.

The image forming module may be a mainframe host, terminals, personal computers, any kind of mobile computing devices or combination thereof. In addition, the image forming module 86 connect with the secondary charged particle detector module 85 through a medium selected from the following: cable wire, optical fiber cable, portable storage media, IR, Bluetooth, intranet, internet, wireless network, wireless radio, and any combination thereof. In one embodiment, secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 802.

The above components of the system are well known to those skilled in the art and are not presented here to limit the scope of the present invention. Alternatives, and insubstantial modifications of these components should be construed equivalent to the disclosure of the present invention.

The monitoring module 87 is coupled to the image forming module 86 of the image forming apparatus to monitor fabrication uniformity of the sample 90 within the scanned image received from image forming module 86. In one embodiment, the monitoring module 87 connects to and accesses the image forming apparatus through a medium selected from the following: cable wire, optical fiber cable, portable storage media, IR, manual input of humans, Bluetooth, intranet, internet, wireless network, wireless radio, and any combination thereof. Further, the monitoring module 87 may be implemented as one selected from the following: a mainframe host, a terminal computer, a personal computer, any kind of mobile computing devices, and any combination thereof. In one embodiment, a computer program for monitoring fabrication uniformity is encoded on a computer readable medium disposed within the monitoring module 87 so that the monitoring module 87 is able to perform the steps of monitoring fabrication uniformity illustrated in conjunction with FIG. 5, wherein the details of the steps of monitoring fabrication uniformity is described earlier.

To summarize the foregoing descriptions, the method and system for measuring critical dimension and monitoring fabrication uniformity of the present invention identify borders of layout patterns from a scanned image with lower resolution and then statistically process distances measured from the borders to obtain critical dimensions. Therefore, the method and system of the present invention can achieve the following advantages: 1) Since critical dimension information can be obtained from a scanned image with lower resolution, inspection tools with higher scan speed can be used to significantly increase throughput; 2) Critical dimension information and fabrication uniformity of the entire wafer can be obtained; 3) Critical dimension information can be obtained with defect inspection process; and 4) Any type of critical dimension of pattern can be measured by user's choice without any restriction in this invention, while only critical dimension of line width can be measured by CD-SEM.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for monitoring fabrication uniformity, comprising steps of:
defining a plurality of layout patterns within a die of a wafer by a designed layout pattern which comprises a Graphic Data System (GDS) or an Open Artwork System Interchange Standard (OASIS), or is drawn directly;
selecting which specific type of critical dimension of the layout patterns is to be measured, and the corresponding operator;
scanning at least one area of interest of the wafer to obtain at least one scanned image by using an E-beam inspection tool;
aligning the scanned image to the layout patterns to identify a plurality of borders within the scanned image;
calculating distances each measured from the border or the plurality of borders of a pattern associated with the specific type of critical dimension from the scanned image; and
averaging the distances to obtain the value of critical dimension for every die of the entire wafer.

2. A method for monitoring fabrication uniformity according to claim 1, wherein the borders comprise a plurality of border-pixels within a peripheral region of the scanned image, wherein the peripheral region is close to the designed layout pattern and comprises a plurality of pixels of which gray level is greater than a reference value, and the border-pixel is a specific pixel of which gray level is a peak, averaged value of gray level of the pixels or the reference value within the peripheral region, or a pixel shifted a predetermined value from the border-pixel.

3. A method for monitoring fabrication uniformity according to claim 1, wherein the area of interest comprises various types of critical dimension to be measured.

4. A method for monitoring fabrication uniformity according to claim 1, wherein the type of critical dimension comprises line width, line spacing, corner width of trace, short axis width of conductive contact, long axis width of conductive contact, diameter of conductive contact, spacing between conductive contacts, or spacing between trace and conductive contact.

* * * * *